(12) United States Patent
Morales et al.

(10) Patent No.: US 6,981,549 B2
(45) Date of Patent: Jan. 3, 2006

(54) HYDRAULIC FRACTURING METHOD

(75) Inventors: Hugo Morales, Katy, TX (US); Gadiyar Balkrishna, River Ridge, LA (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 10/288,993

(22) Filed: Nov. 6, 2002

(65) Prior Publication Data

US 2004/0211558 A1  Oct. 28, 2004

(51) Int. Cl.
*E21B 43/26* (2006.01)
*E21B 47/00* (2006.01)

(52) U.S. Cl. .............................. 166/250.1; 166/308.2; 73/152.39; 702/11; 703/10

(58) Field of Classification Search ............ 166/252.5, 166/250.1, 280.1, 280.2, 283, 305.1, 308.1, 166/308.2, 308.5, 177.5; 73/152.01, 152.18, 73/152.39, 152.41, 152.42, 152.55; 702/6, 702/11, 12; 703/10
See application file for complete search history.

(56) References Cited

U.S. PATENT DOCUMENTS

| | | | |
|---|---|---|---|
| 3,822,747 A * | 7/1974 | Maguire, Jr. ................. | 166/259 |
| 4,848,467 A * | 7/1989 | Cantu et al. ................. | 166/281 |
| 4,964,466 A * | 10/1990 | Williams et al. ............. | 166/300 |
| 5,103,913 A * | 4/1992 | Nimerick et al. ........ | 166/308.2 |
| 5,246,602 A * | 9/1993 | Forrest ........................ | 166/283 |
| 5,275,041 A * | 1/1994 | Poulsen .................... | 73/152.31 |
| 5,562,160 A * | 10/1996 | Brannon et al. ......... | 166/250.1 |
| 6,705,398 B2 | 3/2004 | Weng ....................... | 166/250.1 |
| 2003/0050758 A1* | 3/2003 | Soliman et al. ................ | 702/6 |

FOREIGN PATENT DOCUMENTS

EP  0401431  12/1990

OTHER PUBLICATIONS

TerraTek, TerraFRAC™ A Fully Three-Dimensional Hyrdaulic Fracturing Simulator Available on Pentium PC, 2005, 5 pages.*
Schlumberger, CoolFrac, Aug. 2003, 4 pages.*
Denney, Dennis, Optimizing Fracture-Fluid Crosslink, Stability, and Break Times on Bottomhole-Temperature-Gauge Data, Journal of Petroleum Technology, vol. 56, Sep. 2004 (date of paper Oct. 2003), pp. 78 and 79 (5 pages).*
SPE 8441—*Computing Downhole Temperature in Petroleum and Geothermal Wells*. By Gary R. Wooley, Sep. 23, 1979.
SPE 15305—*Microcomputer Analysis of Hydraulic Fracture Behavior Using a Quasi 3-D Simulator*. By R.H. Morales, Jun. 18, 1986.
SPE 78173—*Equilibrium Test—A Method of Closure Pressure Determination*. By X.Weng, V.Pandey, K.G. Nolte, Oct. 20, 2002.
SPE 36494—*Field Investigation of Heat Transfer in Hydraulic Fractures and the Effect of Heat Transfer on Fracturing Fluid Design*. David P. Craig, Ted D. Brown and John W, Ely—Oct. 6-9, 1996, pp. 837-847.

* cited by examiner

*Primary Examiner*—Jennifer H Gay
(74) *Attorney, Agent, or Firm*—David Cata; Tim Curington; Robin Nava

(57) ABSTRACT

The present invention relates to methods of designing a hydraulic fracturing treatment in a subterranean reservoir and methods of treatment. Methods of the invention include quantifying reservoir parameters such as bottomhole temperature and formation permeability, then assessing the temporary variation in temperature of the formation due to the injection of calibration and/or clean up fluids. Treatment fluids are then design based upon the temporary temperature. The fluids are then pumped to treat the reservoir.

23 Claims, 5 Drawing Sheets

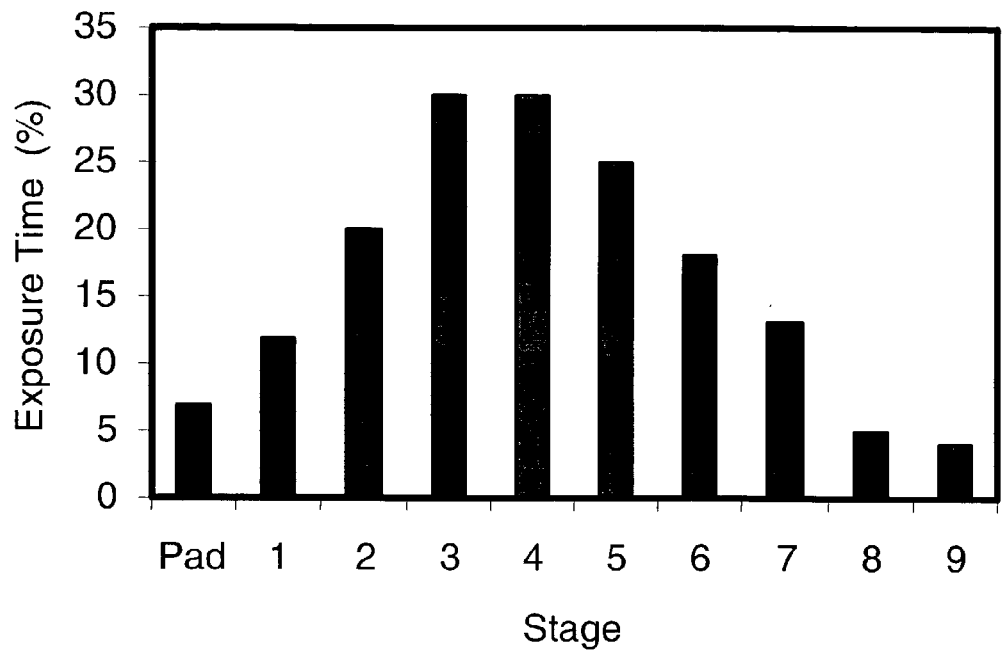
Figure 5.
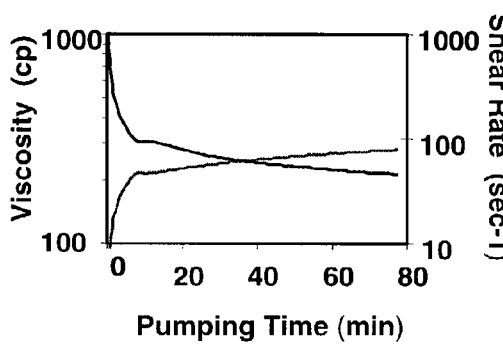
Figure 6-A
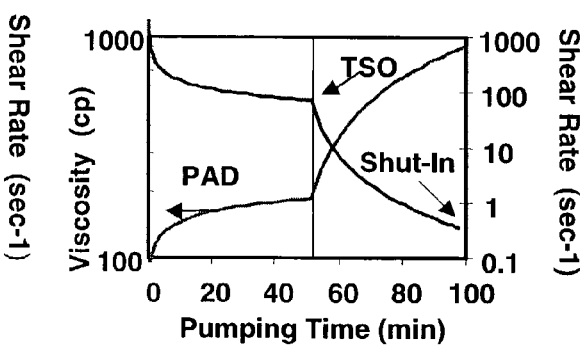
Figure 6-B

HYDRAULIC FRACTURING METHOD

TECHNICAL FIELD OF THE INVENTION

This invention relates generally to the art of hydraulic fracturing in subterranean formations and more particularly to a method and means for optimizing fracture conductivity, particularly in high permeability formations.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation. This provides a partial flowpath for the hydrocarbon to reach the surface. In order for the hydrocarbon to be "produced," that is travel from the formation to the wellbore (and ultimately to the surface), there must be a sufficiently unimpeded flowpath from the formation to the wellbore.

Hydraulic fracturing is a primary tool for improving well productivity by placing or extending channels from the wellbore to the reservoir. This operation is essentially performed by hydraulically injecting a fracturing fluid into a wellbore penetrating a subterranean formation and forcing the fracturing fluid against the formation strata by pressure. The formation strata or rock is forced to crack or fracture. Proppant is placed in the fracture to prevent the fracture from closing and thus, provide improved flow of the recoverable fluid, i.e., oil, gas or water.

In conventional hydraulic fracturing, performed in low-permeability reservoir, the main objective is to generate lengthy and narrow fractures. On the other hand, in high-permeability reservoirs the treatment typically aims at generating a wide, short fracture packed with proppant to prevent the migration of fines often associated with poorly consolidated formations. This can be effectively achieved by promoting a tip-screenout (or TSO) event, i.e. by deliberately causing proppant to pack at a specific location thereby stopping fracture propagation.

A drawback of the fracturing jobs in high permeability formations is that they often result in high skins. The skin is the area of the formation that is damaged by the invasion of foreign substances, principally drilling fluids, during drilling and completion, including a fracturing treatment. With a guar-base fluid, the "foreign substances" are essentially the polymers or the residues left by the gel breakers, additives developed for reducing the viscosity of the gel at the end of the fracturing treatment by cleaving the polymer into small molecules fragments. These substances create a thin barrier, called a skin, between the well and the reservoir. This barrier causes a pressure drop around the wellbore that is quantified by the skin factor. Skin factor is expressed in dimensionless units: a positive value denotes formation damage; a negative value indicates improvement. Obviously, the higher the concentration of gelling agent, the greater the risk of damages and skins. In high permeability formation, this risk is a fortiori increased by the damage to the high proppant concentrations that are often used to obtain wider propped fractures. High skins can also result due to lack of not achieving a TSO.

In the case of low permeability formation, after the fracture initiation process, the shear rate becomes stable with a slightly decreasing trend. In contrast, in high permeability formation, the shear rate decreases drastically. The decrease in shear rate favors the use of lower guar concentrations; mainly because the viscosity of non-Newtonian crosslinked fluids increases with decrease in shear rate.

The differences in reservoir cooldown, and fluid shear rate lead to the need to provide improved methods of fracturing and propping a fracture especially in high permeability formations leading to lower skins and better control of the fracture geometry.

SUMMARY OF THE INVENTION

According to a first aspect of the present invention, it is provided a method of designing a hydraulic fracturing treatment in a subterranean reservoir comprising the steps of a) quantifying reservoir parameters including the expected dynamic bottomhole temperature, b) assessing the shear-rate at which the treatment fluid will be subject to and c) designing a treatment fluid and pumping schedule optimized for said shear-rate and temperature.

In most cases, the process will be an iterative process since the temperature variation depends for instance on the injection rate and total pumped volume.

Bearing in mind that subterranean temperatures are usually significantly higher than surface temperature, the treatment mainly results in a temporary cooling of the formation due to the injection of colder fluids such as clean up, calibration, and frac-and-pack fluids. This is even truer in high permeability formations where the high leak-off helps to condition the formation in temperature. Because the fluid viscosity increases with decrease in temperature, the reservoir cooldown favors the use of fluids with lower gel loading than the typical 40 ppt (pounds of gelling agent per thousand gallons of base fluid) or higher used mostly based on experiences carried over from conventional treatment of low permeability formations.

In addition to lowering the formation and proppant pack damage, the use of crosslinked fluids with low guar concentrations, in high permeability formations, can control height growth by the excessive fluid loss that takes place above and below the perforated interval. This property is advantageous in reservoirs bounded by water or gas cap.

An important aspect of the present invention is to consider the reservoir temperature not as a static value but more truthfully a dynamic value. The dynamic temperatures near the wellbore and within the fracture are to be assessed with a temperature simulator, for instance such as the one described by G. R. Wooley in the SPE paper 8441, "*Computing Downhole Temperature in Petroleum and Geothermal Wells*". The temperature inside the fracture is to be estimated by the method given in Society of Petroleum Engineers paper 3011. Typically, the chemical reactions that are susceptible to occur during the treatment are aligned with the temperature at a specific time of the treatment. For instance, where the initial bottomhole temperature is of 200° F., and due to some fluid injection the temperature decreases to 150° F. a fluid that degrades at 150° F. might be a good solution if during the treatment, that fluid is not actually subject to a temperature higher than 150° F. for most of its exposure time. This approach is less expensive (fluids designed for higher temperature are usually costly) and safer (the fluid will definitely break once the well temperature returns to normal).

In a further or alternative aspect of the present invention, the invention includes the step of assessing the shear rate promoted by the tip-screenout, which, as mentioned above, stops or restrains fracture propagation and thereby, decreases the shear rate. The shear rate change is preferably estimated with the fracturing simulator FracCADE or alternatively by the fracturing simulator described by R. Hugo Morales in SPE paper 15305, *"Microcomputer Analysis of Hydraulic Fracture Behavior with a P3D Simulator"*

According to one aspect of the invention, the pumping schedule is derived from fluid efficiency. The fluid efficiency is defined as the ratio of the volume of the created fracture to the volume of injected fracturing fluids. In other words, with a fluid efficiency of 30%, 70% of the injected fracturing fluid actually leaks off into the formation.

Furthermore, the fluid efficiency is directly related to the fracture closure time, i.e., after propagating a fracture by pumping fluid, the fracture closes as the fluid leaks off. The longer time for the fracture to close the higher the fluid efficiency.

An inflection point in the pressure vs. time decline plot denotes the closure time and closure pressure.

Very often it is difficult to select the closure time and closure pressure because there often are other signatures (i.e., flow regime change or gas kick off) that fake the correct inflection point. Therefore one other aspect of this invention is to determine the closure time and closure pressure using the modified equilibrium test, which is derived from the equilibrium test described later on.

The modified equilibrium method comprises of injecting a fluid at increasing steps, q1, q2, q3, . . . , qn. Thereafter decreasing the rate to the propagation rate and continuing pumping until the pressure becomes stable. When the pumps are shut down the first event depicted in the pressure decline is the closure pressure, which is better depicted in square root of time plot. One advantage of the modified equilibrium method is that the propagation rate is estimated on the fly by slope change in the q vs. pressure plot.

The equilibrium test is described in U.S. patent application Ser. No. 10/178,492, filed on Jun. 24, 2002 and assigned to Schlumberger and whose content is hereby included by reference and also in the paper of the Society of Petroleum Engineering SPE 78173, entitled Equilibrium Test—A Method for Closure Pressure Determination, prepared for presentation in Irving, Tex. on 20–23 Oct. 2002. The equilibrium test comprises injecting a fluid into the formation at a first generally constant rate Q to create a fracture having a volume, and dropping the pumping rate to significantly smaller feed rate q so that the volume of the fracture becomes constant, in other words, the injection and leak-off reach equilibrium. As the fracture volume becomes constant at equilibrium, the well is shut-in. The wellbore pressure is monitored and the closure pressure is determined from the analysis of the wellbore pressure using a time-function of the dimensionless "shut-in" time $\Delta t_D$, preferably based on the square-root of the "shut-in" time $\Delta t_D$. While carrying out the equilibrium test, the small rate q should be less than the fluid leak-off rate in the fracture at the time of rate drop. The initial constant rate Q is preferably the expected fracturing rate of the full-scale treatment. The rate ratio q/Q is preferably less than 0.2.

As a result of the injection rate decrease, the wellbore pressure initially declines as more fluid is leaked off into the formation than is injected in. The fluid leak-off decreases with time, and when the fracture approaches closure, the injection and leak-off reach equilibrium. As the fracture volume becomes constant at the equilibrium, the pressure levels off, which can be easily identified. From the measured pressure at the initial rate drop and at the equilibrium, the closure pressure can be estimated. The pressure drop at shut-in reflects the tortuosity and friction effects corresponding to the small injection rate. The estimated closure pressure can thus be corrected to account for tortuosity and friction. The method is operationally easy to implement in the field.

Though the invention is particularly advantageous for designing and carrying out fracturing of high permeability formations, with eventually simultaneous placement of a gravel pack, it is far from being limited to that aspect. In particular, the invention enables a better control of the geometry of a fracture—hence making it possible to ensure that it is located in a narrow pay zone and does not extend to adjacent areas by controlling the tip-screenout event and the fracture height. In its most general aspect, the invention consists in including the fluid and treatment as variables used for the design of the fluid and treatment.

BRIEF DESCRIPTION OF THE DRAWINGS

The above and further objects, features and advantages of the present invention will be better understood by reference to the appended detailed description, and to the drawings wherein:

FIG. 5 shows the distribution of the residence time of a fluid for the different stages of a fracture treatment;

FIG. 6 shows the fracture shear rate (right axis) and fluid viscosity (left axis), versus pumping time for low (FIG. 6-A) and high permeability fracture (FIG. 6-B);

DETAILED DESCRIPTION AND PREFERRED EMBODIMENTS

In most cases, a hydraulic fracturing treatment consists in pumping a proppant-free viscous fluid, or pad, usually water with some high viscosity fluid additives, into a well faster than the fluid can completely leak off into the formation so that the pressure rises and the rock breaks, creating artificial fracture and/or enlarging existing fracture. Then, a propping agent such as sand is added to the fluid to form slurry that is pumped into the fracture to prevent it from closing when the pumping pressure is released. The proppant transport ability of a base fluid depends on the type of viscosity additives added to the water base.

Water-base fracturing fluids with water-soluble polymers added to make a viscosified solution are widely used in the art of fracturing. Since the late 1950s, more than half of the fracturing treatments are conducted with fluids comprising guar gums, high-molecular weight polysaccharides composed of mannose and galactose sugars, or guar derivatives such as hydropropyl guar (HPG), carboxymethylhydropropyl guar (CMHPG). Crosslinking agents based on borate, titanium, zirconium or aluminum complexes are typically used to increase the effective molecular weight of the polymer and make them better suited for use in high-temperature wells.

To a smaller extent, cellulose derivatives such as hydroxyethylcellulose (HEC) or hydroxyethylcellulose (HPC) and carboxymethylhydroxyethylcellulose (CMHEC) are also used, with or without crosslinkers. Xanthan and scleroglucan, two biopolymers, have been showed to have excellent proppant-suspension ability even though they are more expensive than guar derivatives and therefore used less frequently. Polyacrylamide and polyacrylate polymers and copolymers are used typically for high-temperature applications.

Figure 1:
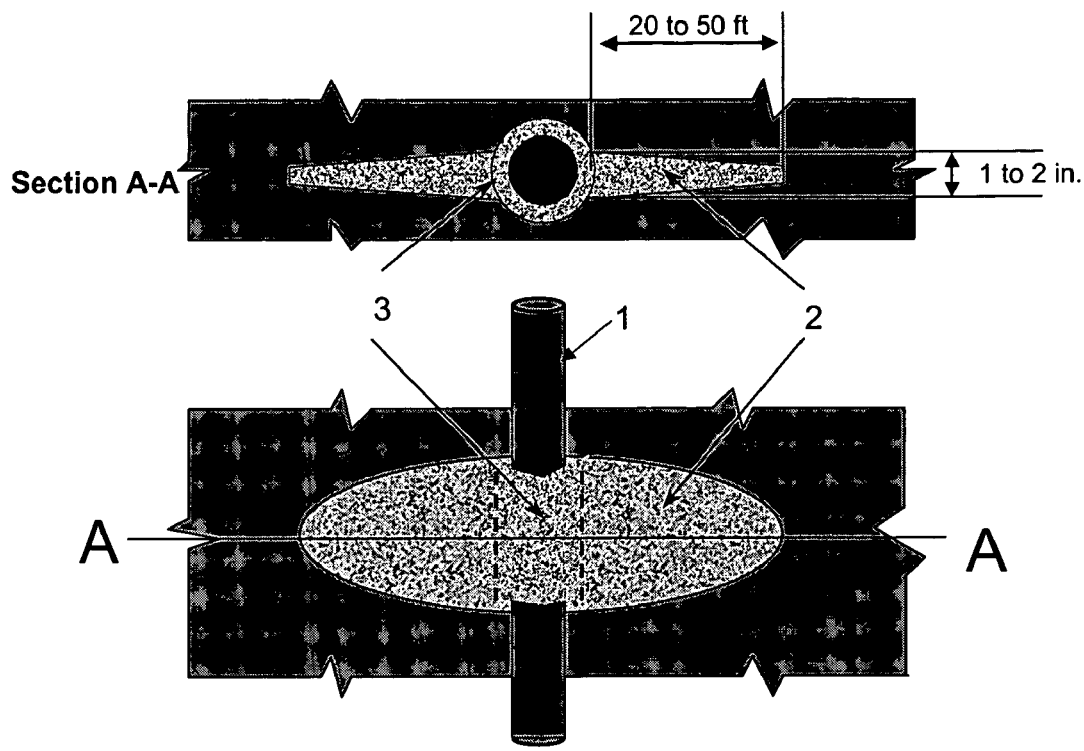
FIG. 1 shows a typical fracture, in side (FIG. 1-A) and section (FIG. 1-B) views.

Proppant material can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to improve the clustering ability of the proppant.

Where the formation is of high permeability (greater than 10 mD), the main objective of frac/packing treatment is to obtain a high conductivity fracture and an annular pack in a single pumping operation. FIG. 1 depicts a fracture zone in a subterranean formation of high permeability. The actual wellbore or hole in the earth into which pipe 1 is placed through which the hydrocarbon flows from the reservoir up to the surface crosses a producing zone of interest. A fracture 2 is deliberately created and gravel is placed within the wellbore in the annular surrounding the pipe (the annular pack 3) and extends within the fracture 2. In high permeability formation, the target is typically to have a fracture short (less than 50 ft) and wide (1 to 2 in. width) as shown by the section view A—A in FIG. 1. To achieve this it's critical to promote a tip-screenout (TSO) event, which restrains further fracture propagation and efficient proppant packing in the fracture and annular space around the wellbore.

Figure 2:
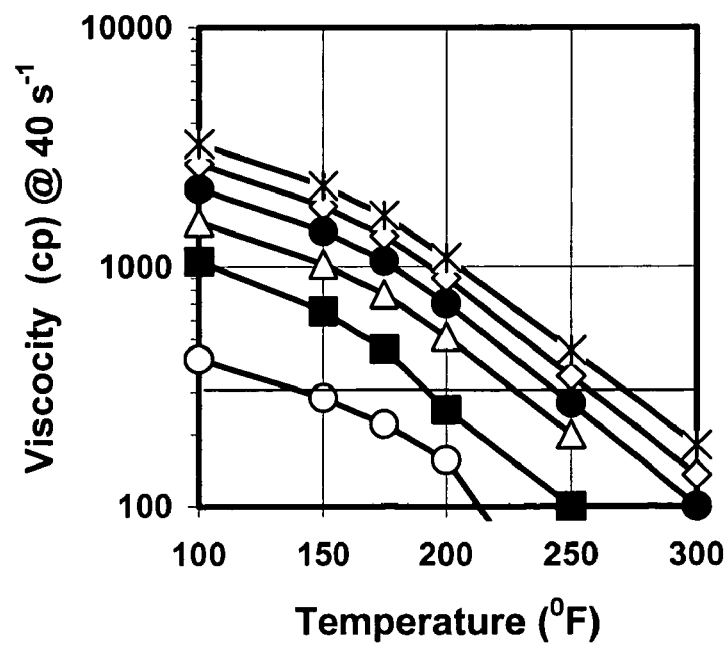
FIG. 2 shows variation in viscosity as a function of temperature and polymer loading.
Figure 3:
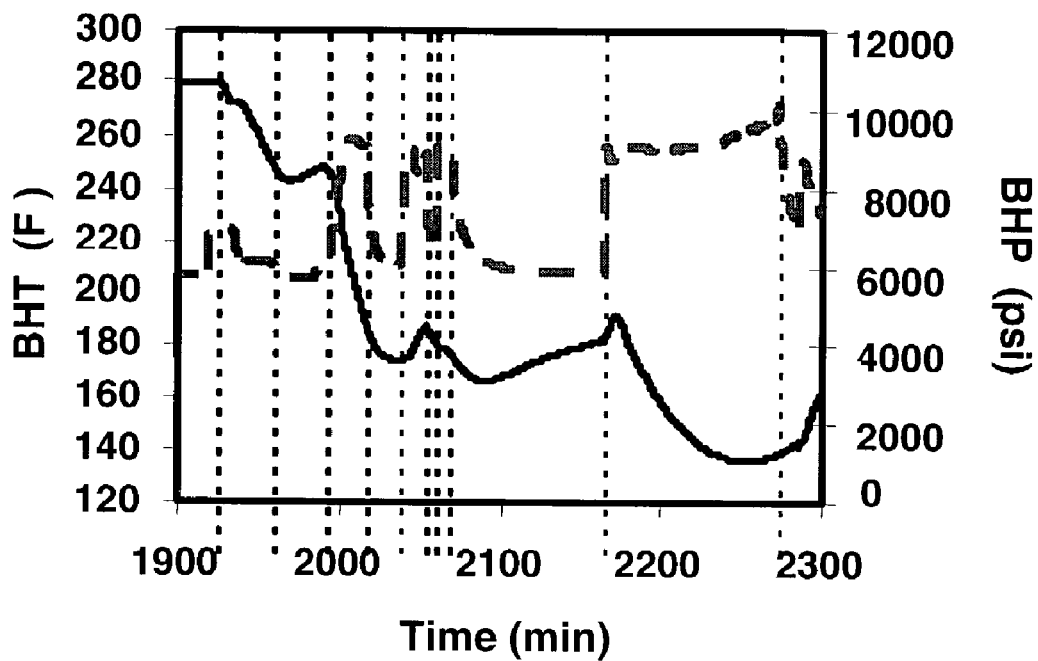
FIG. 3 shows the bottomhole temperature profile versus time during the calibration the fracture treatment.

The inventors investigated the temperature dependency, because the viscosity of Non-Newtonian fluids increases with decrease in temperature as shown in FIG. 2 that shows the effect of the temperature on the viscosity (in cP or $s^{-1}$, at a shear of 40 $s^{-1}$) of six aqueous fluid comprising respectively 15 (open circles), 20 (black squares), 25 (open triangles), 30 (black circles), 35 (open lozenges) and 40 pounds (stars) of guar per thousand gallons of base fluid. Based on field data (bottomhole gauges) they observed that significant cool down in the wellbore occurs due to the injection of pre-frac/packing fluids (acid and calibration fluids) as shown in FIG. 3 that shows temperature cool down from injection of calibration fluid. The pressure events (Bottom Hole Pressure or BHP, right Y-axis) shown the calibration treatments and the fracture job. This figure, which is typical for high permeability formations, shows that the bottom hole static temperature (or BHT, left Y-axis) decreased from 280° F. to 180° F. before the main frac/pack treatment was pumped. The temperature decrease results from pumping acid and other calibration treatments. Although, not shown in the figure, commercial temperature simulator can closely predict the temperature profile.

Figure 4:
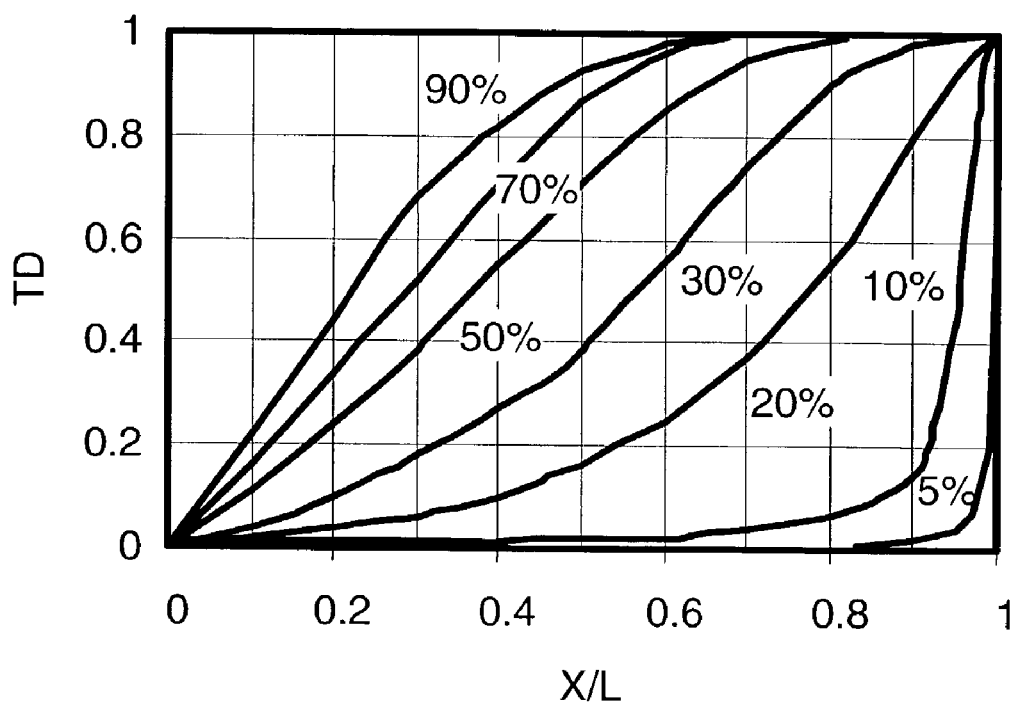
FIG. 4 shows the changes of the normalized temperature along the fracture length as function of fluid efficiency.

It is worth noting that that the cool down is not limited to the near wellbore region but it can extend into the fracture wings. It is known to solve the problem of temperature cool down along the fracture length assuming a uniform leakoff rate as illustrated in FIG. 4. FIG. 4 shows the normalized temperature Td (Td=0 at fracture entrance, Td=1 at fracture end), along with fracture length (X/L=0) at fracture entrance and X/L=1 at fracture end) as function of fluid efficiency (indicated in percentage labeling each curve). According to FIG. 4, the lower the fluid efficiency, the less is the influence of the reservoir temperature. In high permeability formations typical fluid efficiencies at the onset of TSO are less than 20%, while in low permeability formation the fluid efficiencies are greater than 40%. The FIG. 4 indicates that the fluid remains at wellbore temperature (cool down effect) inside the fracture for most part of its length. This favors the design of crosslinked fracturing fluid based on cooldown temperature. While in low permeability formation although the wellbore is cooled down, the fluid inside the fracture rapidly increases to static reservoir temperature. The cool down fluid in the fracture allows using lower gel concentration. Therefore FIG. 2 may be also used as a fluid selection criterion based on cool-down temperature: say the cool-down temperature is 150° F. (65.5° C.) and the required viscosity is 40 $s^{-1}$, then a guar loading is given by the intercept of 150° F. and 300 cP, in the present case corresponding to the open circle curve, i.e. 15 pounds per thousand gallons of base fluid.

The fracture geometry and proppant placement are highly dependent on viscosity, we focused our investigation on the fluid viscosity behavior in both high and low permeability formations. The fluid viscosity is a function of shear rate and temperature. The viscosity of Non-Newtonian fluids increases with decrease in shear rate. In low permeability formations, longer and narrow fractures are desirable resulting in longer pump times (>1 hr). Therefore, the fluid should have high efficiency (>45%) that translates to higher viscosity for longer duration. However, in high permeability formations the fractures are short and wide thus pump times are short (in most cases <30 minutes).

FIG. 5 is a model of the fluid residence time inside the fracture. Note that fluids pumped earlier and later have less exposure time than fluids pumped in the intermediate stages. At no stage is the fluid present for more than 30% of the total pumping time. Therefore it is not necessary for the fluid to be stable for longer than a fraction (30%) of the pumping time. This implies that we can use an aggressive breaker program along with low guar concentrations.

The viscosity versus shear rate is illustrated in FIGS. 6$a$ (low permeability) and 6$b$ (high permeability). In the case of low permeability formation, after the fracture initiation process the shear rate history becomes stable with a slightly decreasing trend, consequently the viscosity is also stable with slightly increasing trend. In contrast, after the TSO event in high permeability formation, the shear rate decreases drastically (by one order of magnitude) as a result the viscosity increases also drastically. The increase in viscosity allows using lower gel concentration fluid (25 ppt or lower).

Figure 7:
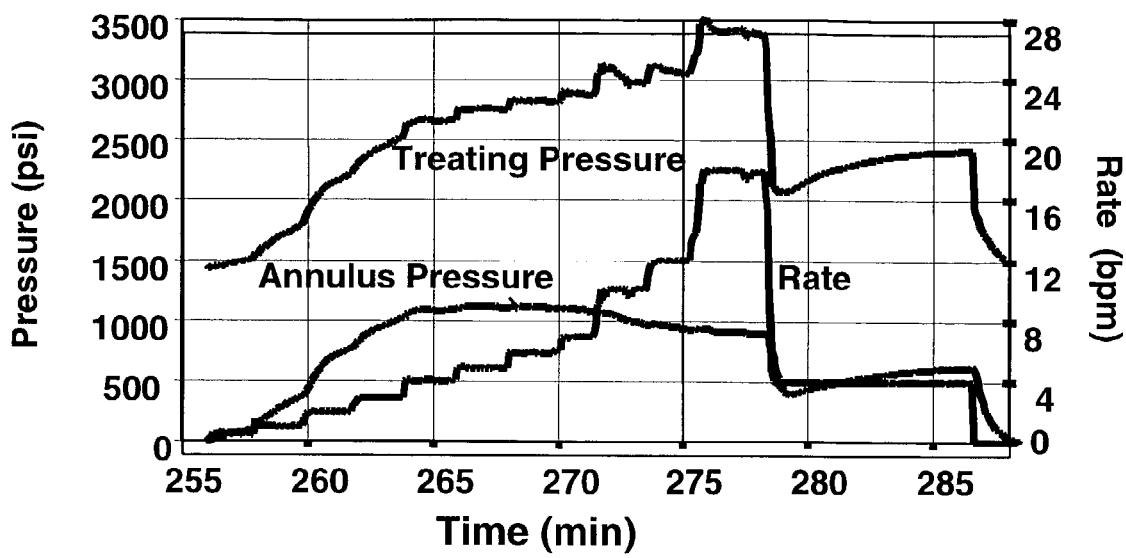
FIG. 7 shows the principle of an evaluation of the closure pressure using the Modified Equilibrium method.

The equilibrium method (FIG. 7) is used to predict closure. The principle behind the equilibrium method is that by decreasing the rate to the propagation rate, the fracture area closes until a small fracture (equilibrium fracture) remains open. This method consists of pumping a step rate test to determine propagation rate on the fly and once the maximum step rate has been pumped, slow down the rate to the propagation rate and continue pumping until attaining a steady state pressure response. When the pumps are shut down the first event depicted in the pressure decline is the closure pressure (closure time).

The method of the invention is typically carried out with the following step-by-step procedure:

Determine cool down temperature using the calibrated temperature simulator and/or downhole gage data from neighboring formations.

Determine fluid exposure time to aid in breaker schedule design.

Determine the expected shear rate profile.

Design fluid: The fluid design is based on cool down temperature and expected shear rate.

Execution

Pump acid with diverter stages. The purpose of acid is to clean the perforations and remove filter cake damage, and aid in cooling the formation.

Pump the step rate test (modified equilibrium method) to estimate the closure pressure.

Pump calibration treatment to obtain fluid efficiency, which is based on closure pressure.

Design slurry schedule using the pump schedule generator, which determines the slurry schedule from fluid efficiency or fluid coefficient.

Pump job and get TSO.

The invention results in designing fracturing fluids having a reduced guar concentration suitable to reservoirs with permeabilities greater than 10 md, Young's modulus smaller than $1.5\ 10^6$ psi, and a cool down temperature less than 300° F.

Figure 8:
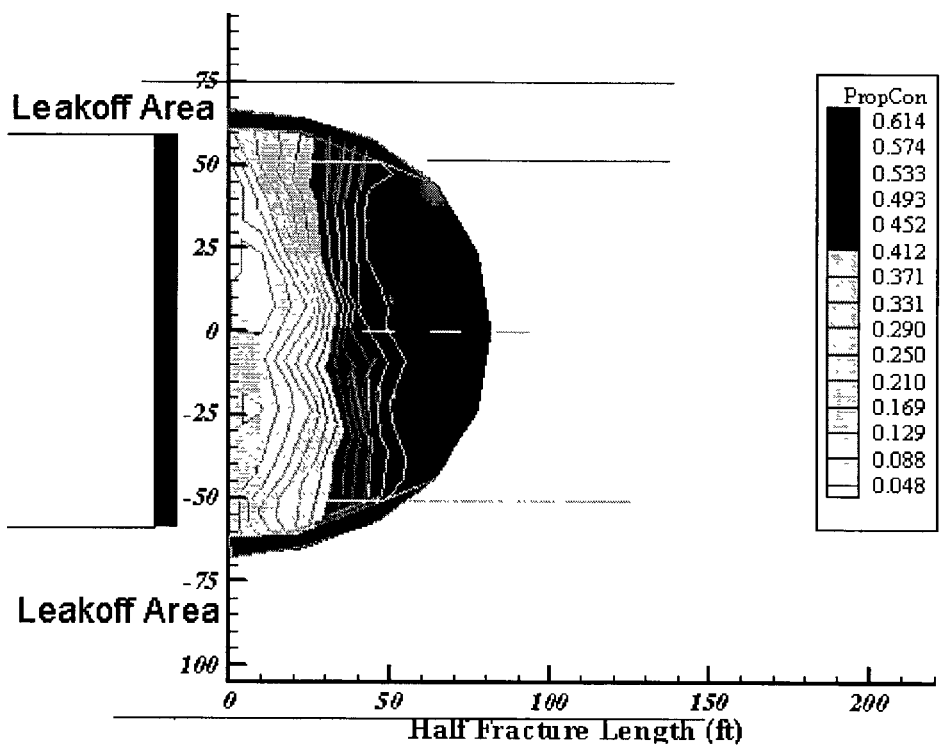
FIG. 8 shows the proppant concentration achieved using the process of the invention for fracturing a high permeability formation.
Figure 9:
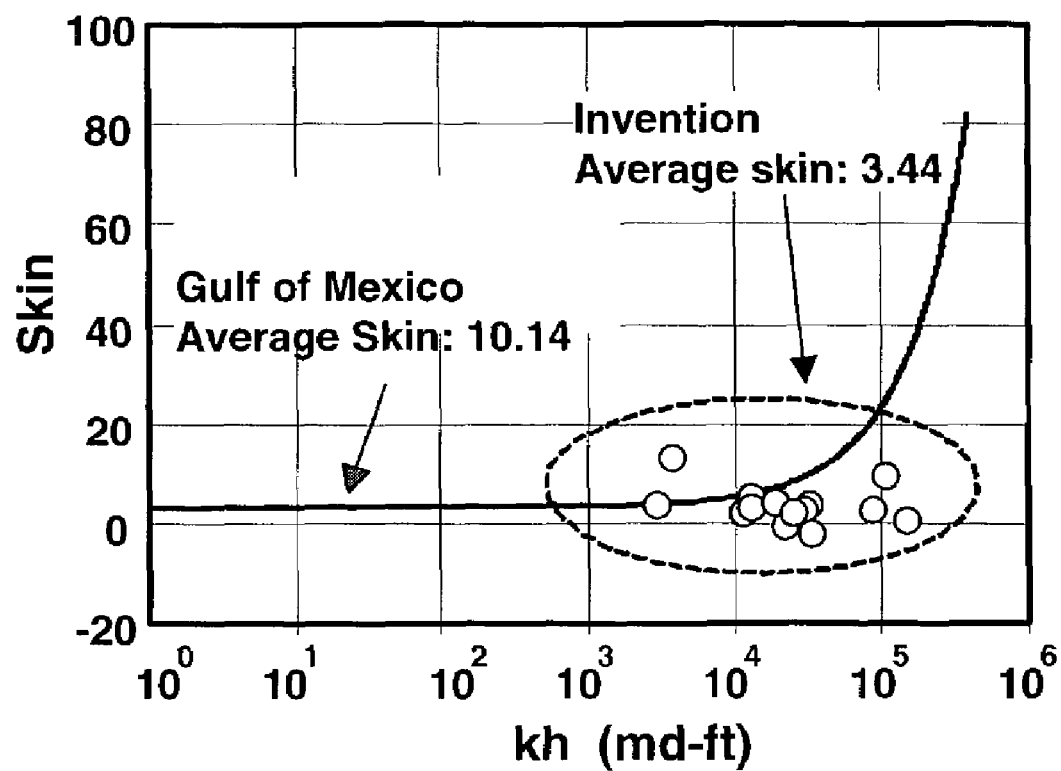
FIG. 9 shows the skins versus the permeability of the formation, as reported for 95 tests using conventional treatments and using the process according to the invention.

Since the method allows accurate control of the height and length, frac-and-pack treatment may be performed near water or gas cap contact. This is illustrated with FIG. 8 that represents the proppant concentration along the fracture length. FIG. 8 shows that height control is achieved by limiting the perforated interval so as to leave leakoff areas above and below the perforated interval. Height growth is controlled by the excessive fluid loss above and below the perforated interval (i.e., the proppant bridges due to dehydration and prevents pressure transfer).

In addition, the use of low guar crosslinked gel decreases the proppant pack and wellbore damage. All this contributes to lower skins (increase production). This is shown in FIG. 8. The figure shows that skins from build-up data for the Gulf of Mexico increase with increase in kh. The overall average is 10.14 while the skins from frac/packs by the method indicated here has an average of 3.4.

Having described, we claim:

1. A method of designing a hydraulic fracturing treatment in a subterranean reservoir comprising the steps of a) quantifying reservoir parameters including the bottomhole temperature and the formation permeability, b) injecting a calibration fluid, an acid, or any mixtures thereof, c) assessing the temporary variation in temperature of the formation due to the injection prior to a fracturing operation of the calibration fluid, the acid, or any mixtures thereof, and d) designing a treatment fluid optimized for said temporary temperature variation.

2. The method of claim 1, wherein said temporary variation is a cool-down.

3. The method of claim 1, further comprising the step of assessing fluid efficiency.

4. The method of claim 3, wherein the fluid efficiency is derived from the assessment of the fracture closure time and fracture closure pressure.

5. The method of claim 4, wherein the fracture closure pressure is determined using an equilibrium test.

6. A method of designing a hydraulic fracturing treatment in a subterranean reservoir comprising the steps of a) injecting a calibration fluid, an acid, or any mixtures thereof, b) quantifying reservoir parameters including the bottomhole temperature and the formation permeability after the injection prior to a fracturing operation of the calibration fluid, the acid, or any mixtures thereof, c) assessing the shear-rate at which the treatment fluid will be subject to œs a function of time during the progress of the treatment and d) designing a treatment fluid and pumping schedule optimized for said shear-rate.

7. A method for fracturing a subterranean formation comprising assessing the bottomhole temperature and the formation permeability, injecting a calibration fluid, an acid, or any mixtures thereof, assessing the temporary variation in temperature of the formation due to the injection prior to a fracturing operation of the calibration fluid, the acid, or any mixtures thereof, designing a fracturing fluid suitable for said temporary temperature variation and pumping said fracture fluid.

8. The method of claim 7, wherein said temporary variation is a cool-down.

9. The method of claim 7, wherein the fluid is designed so fluid efficiency is suitable to the expected cool-down temperatures and shear rates.

10. The method of claim 7, further comprising the step of assessing the fracture closure time and fracture closure pressure to evaluate fluid efficiency of the designed fluid.

11. The method of claim 7, wherein said fracture closure pressure is determined using an equilibrium test.

12. The method of claim 7, wherein said fracture closure pressure is determined using a modified equilibrium test.

13. The method of claim 7, wherein the fracturing fluid is designed to be stable during no more than 30% of the total injection time.

14. The method of claim 7, further comprising the step of assessing the shear-rate during the fracturing treatment and designing the fluid based on the viscosity expected at the cool-down temperature and expected shear-rate.

15. A method for fracturing a subterranean formation comprising assessing the bottomhole temperature and the formation Young modulus, injecting a calibration fluid, an acid, or any mixtures thereof, assessing the temporary variation in temperature of said formation due to the injection prior to a fracturing operation of the calibration fluid, the acid, or any mixtures thereof, designing a fracturing fluid suitable for said temporary temperature variation and pumping said fracture fluid.

16. The method of claim 15, wherein said temporary variation is a cool-down.

17. A method for fracturing a subterranean formation having a formation permeability greater than 10 mD comprising injecting a calibration fluid, an acid, or any mixtures thereof, assessing the temporary variation in temperature of the formation due to the injection prior to a fracturing operation of the calibration fluid, the acid, or any mixtures thereof, designing a fracturing fluid suitable for said temporary temperature variation, and pumping a fracturing fluid comprising a base fluid and a gelling agent, said gelling agent present in the fluid at a ratio between about 10 and about 40 pounds per thousands gallons of base fluid.

18. The method of claim 17, wherein said gelling agent is a crosslinked guar.

19. The method of claim 17, further comprising assessing the shear-rate at which the fracturing fluid will be subject to as a function of time during the progress of fracturing the subterranean formation, and designing a fracturing fluid and pumping schedule optimized for said temporary temperature and said shear-rate.

20. A method for fracturing a subterranean formation having a formation permeability greater than 10 mD comprising injecting a calibration fluid, an acid, or any mixtures thereof, assessing the temporary variation in temperature of the formation due to the injection prior to a fracturing operation of the calibration fluid, the acid, or any mixtures thereof, designing a fracturing fluid suitable for said temporary temperature variation, and pumping a fracturing fluid comprising a base fluid and a gelling agent, said gelling agent present in the fluid at a ratio comprised between about 10 and about 20 pounds per thousands gallons of base fluid.

21. The method of claim 20, further comprising assessing the shear-rate at which the fracturing fluid will be subject to as a function of time during the progress of fracturing the subterranean formation, and designing a fracturing fluid and pumping schedule optimized for said temporary temperature and said shear-rate.

22. A method for controlling the height of a fracture bounded by water or gas cap in a subterranean formation comprising injecting a calibration fluid, an acid, or any mixtures thereof, assessing the temporary variation in temperature of the formation due to the injection prior to a fracturing operation of the calibration fluid, the acid, or any mixtures thereof, designing a treatment fluid suitable for said temporary temperature variation, and injecting a treatment fluid having an optimized fluid efficiency of less than 20%.

23. A method for fracturing a subterranean formation and promoting a tip screen out, the method comprising injecting a calibration fluid, an acid, or any mixtures thereof, assessing the temporary variation in temperature of the formation due to the injection prior to a fracturing operation of the calibration fluid, the acid, or any mixtures thereof designing a fracturing fluid suitable for said temporary temperature variation and pumping said fracture fluid.

* * * * *